United States Patent [19]
Gaddis

[11] 3,909,421
[45] Sept. 30, 1975

[54] METHOD OF MAKING HIGH VISCOSITY AQUEOUS MEDIUMS

[76] Inventor: Preston G. Gaddis, 203 S. Osage, Bartlesville, Okla. 74003

[22] Filed: Aug. 20, 1973

[21] Appl. No.: 389,661

Related U.S. Application Data

[63] Continuation of Ser. No. 173,286, Aug. 19, 1971, abandoned.

[52] U.S. Cl.......... 252/8.55 D; 166/275; 252/8.5 A; 252/8.55 R; 252/316
[51] Int. Cl.² ......................................... E21B 43/20
[58] Field of Search....... 252/8.5 A, 8.55 R, 8.55 D, 252/313, 316; 166/275

[56] References Cited
UNITED STATES PATENTS

| | | | |
|---|---|---|---|
| 3,039,529 | 6/1962 | McKennon | 252/8.55 X |
| 3,051,234 | 8/1962 | Kyte | 166/275 |
| 3,079,336 | 2/1963 | Stright et al. | 252/8.55 X |
| 3,081,260 | 3/1963 | Park | 252/8.5 |
| 3,282,337 | 11/1966 | Pye | 166/275 |
| 3,323,603 | 6/1967 | Lummus et al. | 252/8.5 |
| 3,425,669 | 2/1969 | Gaddis | 259/18 |
| 3,670,820 | 6/1972 | Norton et al. | 252/8.55 X |
| 3,827,964 | 3/1958 | Sandiford et al. | 252/8.55 X |

*Primary Examiner*—Leland A. Sebastian
*Attorney, Agent, or Firm*—Richards, Harris & Medlock

[57] ABSTRACT

High viscosity aqueous mediums are produced by the simultaneous addition to an aqueous solution of a major effective amount of a particulate, high molecular weight, hydratable polymer, such as hydrolyzed polyacrylamide and a minor effective amount of a particulate inorganic compound, such as bentonite, to thereby form a complex between the polymer and the inorganic compound to give the final aqueous composition an increased viscosity. The polymer and inorganic compound are preferably added to the water by dispersing a physical admixture of the polymer and inorganic compound as discrete particles onto a moving plane of water to assure intimate contact of the polymer and compound as they contact the water.

10 Claims, No Drawings

METHOD OF MAKING HIGH VISCOSITY AQUEOUS MEDIUMS

RELATED APPLICATION

This is a continuation of application Ser. No. 173,286 filed Aug. 19, 1971 now abandoned.

BACKGROUND OF THE INVENTION

1. Field of the Invention

This invention relates to high viscosity aqueous solutions. In another aspect, this invention relates to methods for preparing high viscosity liquid compositions and more particularly to methods of preparing high viscosity water solutions by addition thereto of hydratable materials.

2. Description of the Prior Art

High viscosity aqueous compositions are used in various industrial processes. For example, water solutions of hydrolyzed polyacrylamide are used in the secondary recovery of petroleum from subterranean formations, as is described in some detail in U.S. Pat. No. 2,827,964 issued Mar. 25, 1958, and entitled "Secondary Recovery of Petroleum". Such solutions also find use in the treatment of paper pulp for improving filler retention by suspending the fibers before sheet formation; Date, et al., *Paper Trade J.*, 143–32–3 (Nov. 9, 1959) as well as in the manufacture of asbestos paper, U.S. Pat. No. 3,076,740 issued in 1963. These solutions also find use in many flocculation processes. For example, they are used in the flocculation of clays as is mentioned in U.S. Pat. No. 3,009,510 issued in 1961, British Pat. No. 761,021 issued in 1956 and German Pat. No. 1,054,392 issued in 1959.

Various high molecular weight hydratable polymers such as polyacrylamide hydrolytes, carboxymethyl cellulose, hydroxyethylether cellulose, guar gum, and vinyl acetate-maleic anhydride copolymers have also been used for beneficiating drilling fluids. U.S. Pat. Nos. 3,081,260 issued in 1963; 3,323,603 issued June 6, 1967; and 3,558,545 issued Jan. 26, 1971. It is known that these polymers can increase the viscosity of the drilling fluids without increasing the solids content which is beneficial for various reasons set out in the above patents.

It is also generally known that the viscosity of the water solutions of the hydratable polymers mentioned above will increase with increased molecular weight of the polymers. For this reason in those applications where high viscosity solutions are needed, for example, in the recovery of petroleum from highly permeable formations, very high molecular weight polymers are utilized. However, to increase the molecular weight of a straight chain polymer necessitates that the chain be lengthened. The longer the polymer molecule becomes the more susceptible it is to shear as it is handled through pumps, valves, orifices and as it passes through the pores of a formation. Shearing of the molecules of course reduces the molecular weight and lowers the viscosity of the solution which is, for many applications, undesirable.

Even if the very high molecular weight polymers did not shear there are some applications where higher viscosity solutions are desired than can be prepared economically from presently available polymers.

Thus, there is a need for a technique which can economically increase the viscosity of polymer solutions without increasing the length of the polymer molecules and thereby avoid the shear-thinning problems.

Also, many of the polymers are hydrolyzed to produce the alkali metal salts of the polymers to render them more water soluble. When these "ionic" polymers are utilized in environments where other ions are present they can be ion exchanged or the polymers can be attracted to another substance having an ionic charge. If such substance is a subterranean formation, for example, the polymer can be adsorbed onto the walls of the pores of the formation which can reduce the permeability of the formation for longer periods than desired. Thus, it is desirable to provide a high viscosity water solution which has the electrical charges on the polymer substantially neutralized to prevent unwanted adsorption of the polymer onto the walls of subterranean formations.

The present invention provides a method whereby high viscosity water solutions of high molecular weight hydratable polymers may be prepared without the necessity of increasing the length of the polymer molecule. Also, the electrical charges on the polymer are at least partially neutralized using the method of the present invention thus rendering the solutions of the polymer more stable.

The present invention may be generally characterized as an improvement of increasing the viscosity of water and other aqueous solutions by the addition thereto of a dry, particulate, high molecular weight, hydratable polymer. The improvement comprises the step of simultaneously adding to the water a major effective proportion of such a polymer and a minor effective proportion a dry particulate, inorganic hydratable compound. The polymer and the inorganic compound must be intimately admixed while being hydrated.

DESCRIPTION OF THE PREFERRED EMBODIMENT

The preferred embodiment of the present invention includes the steps of physically admixing a dry, particulate, high molecular weight hydratable polymer which upon hydration will have electrically charged sites thereon, such as an anionic hydrolyzed polyacrylamide, with a particulate inorganic compound of approximately colloidal size, such as bentonite, having electrically charged sites thereon. The ratio of bentonite to polyacrylamide is preferably about 1 to 4, by weight, although the ratio can reach 1 to 2. The admixture is then dispersed as discrete particles onto a moving plane of water by use of a device such as illustrated in U.S. Pat. No. 3,425,669 issued Feb. 4, 1969, and entitled "Dry Chemical Feeder Method and Apparatus" to produce a high viscosity water solution.

The preferred polymer is a partially hydrolyzed polyacrylamide having both amide

(1)

and carboxylate groups

(2)

where M is an alkali metal.

Such polymers can be prepared by techniques known to those skilled in the art, one of which is described in U.S. Pat. No. 2,820,777 issued Jan. 21, 1958.

A preferred hydrolyzed polyacrylamide is one having approximately forty percent of the amide radicals on the polyacrylamide chain hydrolyzed to sodium carboxylate groups. One of such polymers is marketed under the trademark "Hi-Vis" by Betz Laboratories, Inc., Trevose, Pennsylvania. Such a polymer is characterized as an anionic polymer and will, when simultaneously wet in the presence of bentonite, which contains substantial quantities of montmorillonite, produce a high viscosity water solution.

Water solutions formed by admixing the bentonite with the acrylamide before mixing with the water are much more effective in reducing the permeability of a porous media than are conventional solutions which only employ the polyacrylamide, as will be understood by reference to the following examples.

EXAMPLE I

A physical admixture of 0.75 lb. "Hi-Vis" and 0.25 lb. bentonite, both of which were in particulate form, was added to 50 gallons of water by use of a device such as illustrated in U.S. Pat. No. 3,425,669, which discharges the particles of the admixture as discrete particles onto a moving plane of water.

The resulting solution was diluted with further water to produce a solution which contained 250 parts per million (by weight) of the polymer and bentonite. The diluted solution was then tested for its permeability reducing characteristics in the following manner. A cylindrical plug 1 inch in diameter and 2 inches in length was prepared from a core specimen removed from a subterranean formation having a high porosity. The plug was determined by conventional techniques to have a porosity of 27.7%, a pore volume of 6.5 cc's, an air permeability of 554 Md. and a liquid permeability (using a simulated formation brine solution) of 478 Md.

With the plug filled with a simulated formation brine solution, a quantity (equal to 8.4% of the pore value of the plug) of the dilute acrylamide and bentonite solution (250 ppm concentration) was injected into the plug at one end thereof. Flow through the plug was always end to end as the plug was removed from a core specimen perpendicular to the longitudinal axis of the core. Thus, to simulate flow through a formation, as during the secondary recovery of petroleum, flow through the plug should be parallel to its longitudinal axis. The polyacrylamide and bentonite solution was followed with a further quantity of the simulated brine solution and the least permeability observed during passage of the brine solution through the plug was 275 Md. Thus, the maximum permeability reduction by treatment with the polyacrylamide and bentonite solution was about 62%, from 478 Md. to 275 Md.

EXAMPLE II

For comparison purposes, a solution containing 500 parts per million (by weight) of "Hi-Vis" only was prepared and used for treatment of a similar plug as described above. The particular plug used and a porosity of 26.9%, a pore volume of 6.41 cc's, an air permeability of 614 Md. and a liquid permeability (using formation brine) of 589 Md.

With the plug filled with the formation brine, a quantity (equal to 20.0% of the pore volume of the plug) of the dilute acrylamide solution (500 ppm) was injected into the plug at one end thereof. The polyacrylamide solution was followed with a further quantity of brine solution. The least permeability observed was 371 Md. Thus, the maximum permeability reduction by the treatment with the polyacrylamide solution was about 62%, from 589 Md. to 371 Md.

From the above examples it can be noted that the same permeability reduction was effected in similar formation specimens, in Examples I and II. However, only one-third as much of the acrylamide and bentonite solution was required to achieve results similar to the polyacrylamide only solution. Further, the polyacrylamide and bentonite solution was only one-half the concentration of the treatment solution containing only polyacrylamide. The increased effectiveness of the polyacrylamide and bentonite solution is believed to be attributable to its greater viscosity because a water solution containing, for example, 2500 parts per million (by weight) of polyacrylamide and bentonite where the ratio (by weight) of bentonite to polyacrylamide is 1 to 4 will have about five times the viscosity of a similarly prepared solution containing 2500 parts per million of polyacrylamide only.

The economic advantages of the solution are readily apparent since the viscosity of the polyacrylamide solution can be increased significantly, as is obvious from the above examples, by the addition of small quantities of bentonite which at present market values costs on the order of twenty times less than polyacrylamide. Further, as the length of the acrylamide molecule has not been lengthened to achieve the increased viscosity, the shear problem involved with mechanical handling of the polymers has not been compounded.

The increased viscosity of the solutions prepared according to the present invention is believed to be caused by attraction of the clay particles to the polyacrylamide molecules to form a complex. This mechanism increases the effective diameter of the molecule and thus increases the viscosity of the solution.

Bentonite, for example, has negative charges on its surface which have been created, in its natural state, by the replacement of aluminum ions in the crystal lattice with lower valence ions such as sodium and calcium leaving a net negative charge on the bentonite particles.

If the clay particles are in proximity to the sodium carboxylate groups on the hydrolyzed polyacrylamide molecule when both are dispersed in the water, negatively charged clay particles are attracted to the sodium ions on the carboxylate group. Unless the polyacrylamide and clay particles are in close physical proximity at the time both are introduced into the water, the negative charge sites on the clay can be neutralized by the hydrogen ions in the water, which is a bipolar compound, and the greatly increased viscosity will not be realized. As the amide groups on the polyacrylamide also exhibit a bipolar charge, much like the water molecule, it is also possible that the hydrogen atoms which exhibit a positive charge also are attracted to the negative charge sites on the clay particles. The union of the polyacrylamide molecules and the clay particles will not only increase the effective diameter of the polyacrylamide, but also reduce the net charge of the molecule rendering it more stable in the presence of ions which may be present in the environs where the solution is used, such as in subterranean formations.

While a hydrolyzed polyacrylamide is the preferred polymer, and bentonite is the preferred inorganic compound, other polymers and inorganic compounds which can attract each other due to the presence of electrical charges on each may be employed.

Typical of such polymers are the class of compounds which may generally be characterized as polyacrylamide hydrolytes which expression is used to include hydrolyzed polyacrylamide and copolymers of acrylamide and acrylic acid as well as copolymers of acrylamide and up to 15 percent of other monomers such as styrene, vinyl acetate, acrylonitrile and the like. Other polymers which may be used are guar gum, carboxymethyl cellulose, polymers of ethylene, propylene and butylene oxide, polyvinyl pyrrolidone, cellulose ether, polystyrene sulfonate, polyacrylates, hydroxyethyl cellulose, polysaccharides and vinyl acetate-maleic anhydride copolymers. The molecular weight of these polymers preferably exceeds 200,000 for most industrial purposes, but polymers having molecular weights of down to 10,000 may also be employed.

Various particulate inorganic compounds may be used such as bentonite, kaolinite, attapulgite, illite and halloysite clays, and the like.

By particulate inorganic particles is meant small, discrete particles of the size normally found in clays used to form drilling muds. For example, about 2 microns or less, and preferably including particles of colloidal size. However, larger particles, e.g., 325 mesh (U.S. Standard) can be utilized, although they are not preferred. The particles of the inorganic compound are preferably of at least about colloidal size as smaller particles will not as effectively increase the viscosity of the final liquid composition.

While the ratio, by weight, of the inorganic compound to the polymer will vary with the nature of the polymer, the particle size of the inorganic compound and the number of electrically charged sites, the ratio will generally be less than 1 to 2. The presence of excess inorganic compound is not desired as it will not contribute effectively to the viscosity of the solution.

While this invention has been described in relation to its preferred embodiments, it is to be understood that various modifications thereof will now be apparent to one skilled in the art upon reading this specification, and it is intended to cover such modifications as fall within the scope of the appended claims.

What is claimed is:

1. In a method of increasing the viscosity of an aqueous medium wherein a particulate hydratable polymer having a molecular weight in excess of 10,000 is to be admixed with the aqueous medium to increase its viscosity, the improvement which comprises:

dispensing the aqueous medium to form a sheet of the medium;

simultaneously dispensing said polymer and a minor viscosity enhancing amount of a dry, particulate, inorganic, hydratable clay onto said sheet of the aqueous medium so that the polymer and clay particles are in close physical proximity and they form a thin, relatively wide curtain-like layer of discrete particles before contact with the aqueous medium to cause intimate admixture of the polymer and clay, the ratio of clay to polymer, by weight, being less than about 1 to 1.

2. The method of claim 1 wherein said polymer is a polyacrylamide.

3. The method of claim 1 wherein said polymer is a polysaccharide.

4. The method of claim 1 wherein said polymer is a carboxymethyl cellulose.

5. The method of claim 1 wherein said polymer is a polyethylene oxide.

6. An improvement in the method of increasing the viscosity of water by the addition to the water of a dry, particulate, high molecular weight polymer having a molecular weight in excess of 10,000, which upon hydrolysis will have electrically charged sites thereon, the improvement which comprises:

dispensing the aqueous medium to form a sheet of the medium;

simultaneously dispensing onto said sheet said polymer and a dry, particulate, inorganic, hydratable clay having a net electrical charge which attracts it to the polymer and thereby increases the effective size of the polymer particles, the polymer and clay being dispensed as a thin, relatively wide curtain-like layer of discrete particles before contact with the aqueous medium to cause intimate admixture of the polymer and clay, the ratio of clay to polymer, by weight, being less than about 1 to 1.

7. The method of claim 6 wherein said polymer is a polyacrylamide.

8. The method of claim 6 wherein said polymer is a polysaccharide.

9. The method of claim 6 wherein said polymer is a carboxymethyl cellulose.

10. The method of claim 6 wherein said polymer is a polyethylene oxide.

* * * * *